No. 675,140. Patented May 28, 1901.
T. G. SAXTON.
METALLIC ROD PACKING.
(Application filed Aug. 14, 1900. Renewed May 3, 1901.)

(No Model.)

Witnesses
Marcus L. Byng
[signature]

Inventor
Thomas G. Saxton
By [signature]
Attorney

UNITED STATES PATENT OFFICE.

THOMAS GUNNI SAXTON, OF LEXINGTON, KENTUCKY, ASSIGNOR TO J. ROGERS BARR, OF SAME PLACE.

METALLIC ROD-PACKING.

SPECIFICATION forming part of Letters Patent No. 675,140, dated May 28, 1901.

Application filed August 14, 1900. Renewed May 3, 1901. Serial No. 58,663. (No model.)

*To all whom it may concern:*

Be it known that I, THOMAS GUNNI SAXTON, a citizen of the United States, residing at Lexington, in the county of Fayette and State of Kentucky, have invented certain new and useful Improvements in Metallic Rod-Packing; and I do hereby declare the following to be a full, clear, and exact description of the invention, such as will enable others skilled in the art to which it appertains to make and use the same.

This invention relates to improvements in rod-packing, and more particularly to metallic packing for piston-rods and valve-stems.

The advantages of metallic or hard packing over soft packing are well recognized on account of the ready destructibility of the latter, which results in leakage and loss of power after short use and necessitates frequent removal and renewal of the packing material, and therefore many constructions have been devised employing metallic packing-rings in place of soft packing; but such constructions have not generally met the requirements on account of their complexity and expense, inapplicability to the ordinary stuffing-boxes of steam-engines, and the difficulty of sufficiently lubricating the rod and packing, on account of which the packing-rings often become dry and adhere to the rod, causing much friction and loss of power and necessitating more frequent renewal of the packing-rings than is desirable.

The objects of my invention are to provide a simple and inexpensive but effective fluid-tight metallic rod-packing construction which may be placed within an ordinary stuffing-box such as is generally employed for packing rods with soft packing without requiring any alteration of the stuffing-box or gland, and, further, to maintain an "oil-bath" for the packing, whereby the packing-rings and the rod may be kept constantly lubricated.

The invention will first be hereinafter more particularly described with reference to the accompanying drawings, which form a part of this specification, and then pointed out in the claims at the end of the description.

Figure 1:
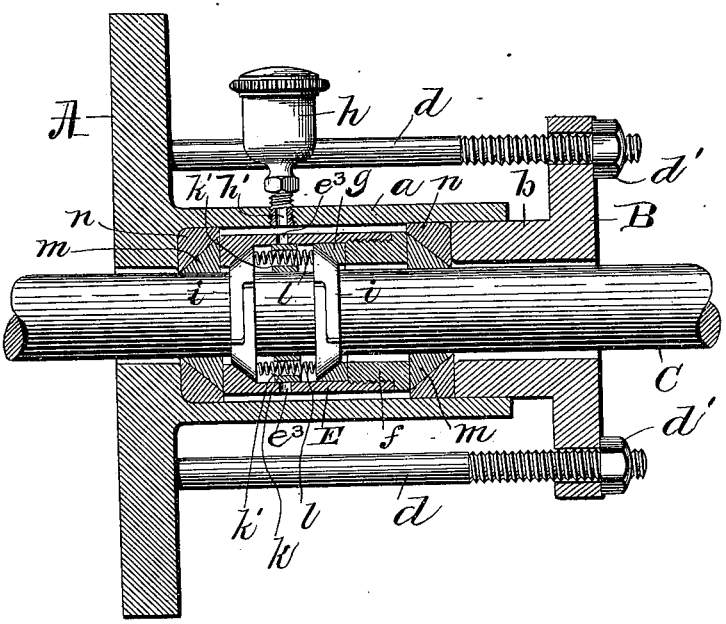
Figure 2:
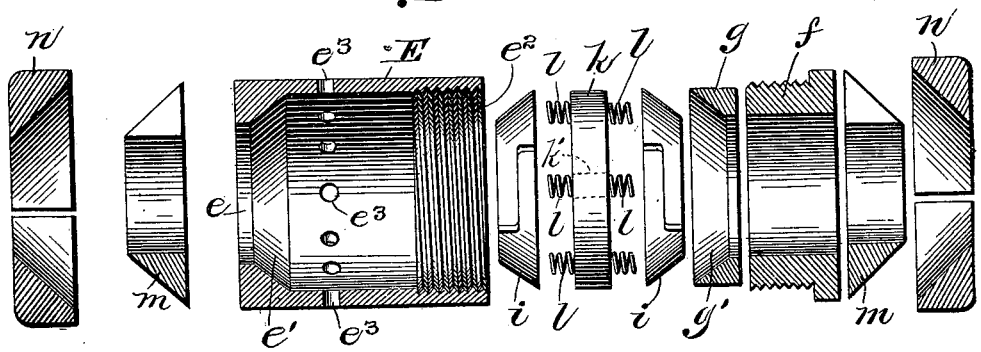

In said drawings, in which corresponding parts are designated by like letters of reference in the several views, Figure 1 is a side elevation, principally in vertical section, of a stuffing-box, rod, and gland with a packing construction embodying my invention applied thereto; and Fig. 2 shows detailed views of the several parts constituting the said metallic construction.

The letter A in the drawings denotes the head of a steam-chest or cylinder; $a$, a stuffing-box thereon; B, a gland or follower to close the stuffing-box, and C a rod passing through the stuffing-box and follower. The stuffing-box and gland or follower B may be of the ordinary type employed for packing rods with soft material, the gland having a cylindrical portion or projection $b$, which enters the annular recess within the stuffing-box around the rod, and said gland or follower B may be secured within the stuffing-box by any suitable means, as by the usual bolts $d$ $d$, attached to the cylinder or steam-chest head and entering holes or eyes in the gland or ears of the gland or follower B and having threaded ends with fastening-nuts $d'$ $d'$ thereon to secure the gland or follower in place.

Within the stuffing-box I provide a preferably cylindrical shell or packing-cup E, surrounding the rod and containing suitable rod-packing or packing-rings, said cup or shell having one end interiorly contracted or reduced and also conical or tapered to the aperture $e$, through which the rod passes, so as to form a seat or saucer $e'$ for a correspondingly-tapered packing-ring, and the opposite end threaded, as at $e^2$, for engagement with a closing-cap or plug $f$, having a cylindrical portion entering the shell or packing-cup. Said cylindrical portion of the cap or plug $f$ may be exteriorly threaded to engage the threads in the shell or cup E or may be otherwise secured thereto. Within the shell or packing-cup E and in front of or adjoining the cap $f$ I provide a ring or packing-saucer $g$, which may be interiorly conical or tapered, as at $g'$, similarly to the seat or saucer $e'$ at the opposite end of the packing-cup or shell, to receive, like the said seat or saucer $e'$, a correspondingly-tapered packing-ring, the said ring or packing-saucer $g$ being introduced into the shell or packing-cup E before the cap $f$ and with the conical or tapered seat or saucer $g'$ facing the packing seat or saucer $e'$. The packing-seat or saucer $g'$ may be formed integrally with the cap $f$, if desired, and the saucer or seat $e'$ may be a separate ring, like the ring $g$, secured within the shell E, though the arrangement described is more desirable. The shell or packing-cup E may be further provided with an annular series of apertures $e^3\ e^3$ about midway or at a suitable distance between the packing seats or saucers $e'$ and $g'$, said apertures being designed to permit oil to drop into the shell or cup E from an oil cup or reservoir $h$ on the stuffing-box, having an inlet or apertured stem $h'$ fitting an orifice in the stuffing-box in line with the apertures or oil-holes $e^3\ e^3$ of the shell or cup E. By this arrangement one or more of the oil-apertures $e^3\ e^3$ will always lie under the oil-inlet $h'$, so that oil may continually feed into the shell or packing-cup E and lubricate the rod and packing therein.

The letters $i\ i$ denote suitable tapered or conical packing-rings fitted about the rod C within the packing seats or saucers $e'$ and $g'$. The said rings $i\ i$ may be of any suitable construction, but are preferably split or divided at one or more points to adapt them to close about the rod under pressure, or the said rings may be formed of a number of sections or segments, with integral portions of adjoining sections overlapping when the sections of the ring are placed together about the rod, thus permitting the rings to be placed about the rod or removed therefrom without disconnecting the rod from its cross-head, rocker-arm, or other connection.

The packing-rings $i\ i$ are adapted to be forced in opposite directions by a spring or springs or other suitable means interposed therebetween, and on account of the tapered or conical surfaces of the rings and their seats or saucers $e'$ and $g'$ (the slant of said surfaces being preferably at an angle of forty-five degrees to the axis of the rod C) the said rings when forced apart will be caused to act equally against their saucers or seats $e'$ and $g'$ and against the rod, thus producing an effectual packing as well as rendering the rings self-compensating for wear. To force said rings $i\ i$ apart, a spiral spring encircling the rod may be employed; but I have shown an annulus or ring $k$, mounted on the rod between the rings $i\ i$ and having a number of apertures $k\ k'$ arranged annularly in its circumference, in which a number of springs $l\ l$ are fitted, so as to expand and yieldingly force the packing-rings apart with sufficient energy to keep the joint tight.

The shell or packing-cup E and the packing-rings inclosed therein are inserted within the stuffing-box between the cylinder or steam-chest head and the gland or follower B; but in order to increase the efficiency of the construction I preferably provide additional packing at the inner end of the stuffing-box or next the cylinder or steam-chest head and also at the outer or front end or next the gland or follower and which may consist of soft metallic packing-rings of any desired form, though preferably at each of the ends mentioned I provide a split packing-ring $m$, embracing the rod and exteriorly tapered or conical, and a similarly interiorly tapered ring or saucer $n$, inclosing the ring $m$ and fitting closely within the stuffing-box. The slant of the conical or tapered surfaces of the rings $m\ m$ and $n\ n$ may be at an angle of forty-five degrees to the axis of the rod C, similarly to the slant of the packing-rings $i\ i$ and seats or saucers $e'\ g'$, and horizontal forces exerted against the said rings $m$ and $n$ will cause them not only to act against each other, but the outer rings $n\ n$ to act against the interior walls of the stuffing-box and the inner rings $m\ m$ against the rod C, the rings $m\ m$ and $n\ n$ being preferably split or divived to adapt them to contract or expand more easily under pressure and render them self-compensating for wear.

The several parts described may be readily applied to a piston-rod or valve-stem by slipping them over the rod into the stuffing-box, beginning with one of the packing-rings $n$ and its inclosed ring $m$, followed by the shell or packing-cup E, a packing-ring $i$ fitting into the seat or saucer $e'$, the spring or springs for forcing the packing-rings apart, the other packing-ring $i$ and its saucer $g$ fitting thereon, the cap $f$, and the rings $m$ and $n$, and finally the gland or follower B, which may be secured to the stuffing-box, with its cylindrical portion $b$ entering the stuffing-box and compressing the shell or packing-cup E between the packing-rings $m\ n$ at opposite ends, and causing said rings to act against the interior walls of the stuffing-box and the rod, as well as against each other. It will be apparent that with the above-described construction a thoroughly effective fluid-tight sliding joint may be continuously maintained. Moreover, by means of the oil-chambers provided around the shell E and within the same beneath the packing-rings $i\ i$ and the apertures $e^3\ e^3$ in the shell or packing-cup E, disposed between said packing-rings, the rod-packing may be kept constantly lubricated, maintaining what I term an "oil-bath" without waste of oil from the stuffing-box. The oil-passage $h'$ for the oil cup or reservoir $h$ may be formed in the stuffing-box at a suitable point or position to permit the oil to drop into the oil-apertures $e^3\ e^3$ of the cup or shell E; or if the said oil-passage $h'$ be already formed in the stuffing-box the shell or packing-cup E may be adjusted to bring the annular series of oil-apertures $e^3\ e^3$ beneath the same by providing the packing or packing-rings $m$ and $n$ of the desired width or adding other packing-rings of suitable widths at the inner end of the stuffing-box between the cylinder or steam-chest head and the said packing-cup or shell E.

The device is simple and compact and may be applied to any piston-rod or valve-stem in conjunction with an ordinary stuffing-box without the expense or alterations of procuring new constructions of stuffing-boxes and glands.

Having thus fully described my invention, what I claim, and desire to secure by Letters Patent of the United States, is—

1. In a rod-packing, the combination with a stuffing-box and gland therefor, of a packing-cup within said stuffing-box, packing-rings in said cup, an oil-chamber intermediate the rings, means within the chamber for forcing the rings apart, and an oil-cup on the stuffing-box communicating with said oil-chamber, substantially as described.

2. In a rod-packing, the combination with a stuffing-box and gland therefor, of a packing-cup within said stuffing-box having confronting interiorly-tapered packing-seats, correspondingly-shaped packing-rings fitting said seats, an annular oil-chamber intermediate said rings, means within the chamber for forcing the rings apart, and an oil-supply communicating with said chamber, substantially as described.

3. In a rod-packing, the combination with a stuffing-box and gland therefor, of a packing-cup within said stuffing-box having confronting interiorly-tapered packing-seats, correspondingly-shaped packing-rings fitting said seats, an annular oil-chamber intermediate said rings provided with ports in its sides, means within the chamber for forcing the rings apart, and an oil-cup on the stuffing-box communicating with said ports, substantially as described.

4. In a rod-packing, the combination with a stuffing-box and gland therefor, of a packing-cup contained in said box and having inclined seats at or near each end thereof, one of which seats is removably fitted in one end of the cup, correspondingly-shaped packing-rings abutting said seats, an oil-chamber intermediate said rings, means within the chamber for forcing the rings apart, and an oil-supply communicating with said chamber, substantially as described.

5. In a rod-packing, the combination with a stuffing-box and gland therefor, of a packing-cup within said stuffing-box, packing-rings in said cup, an oil-chamber intermediate the rings, springs within the chamber for forcing the rings apart, and an annulus or ring on the rod furnishing a bearing for said springs, substantially as described.

6. In a rod-packing, the combination with a stuffing-box and gland therefor, of a packing-cup within said stuffing-box, packing-rings in said cup, an oil-chamber intermediate the rings, springs within the chamber for forcing the rings apart, and an annulus or ring on the rod having apertures receiving one end of the springs, substantially as described.

7. In a rod-packing, the combination with the stuffing-box, rod and gland, of interiorly-tapered packing-rings at or near the opposite ends of the stuffing-box, exteriorly-tapered packing-rings fitting within said first-mentioned rings about the rod, a packing-receptacle interposed between the rings at the opposite ends of the stuffing-box, and having confronting packing-seats, together with rod-packing rings fitting said seats, and means interposed between said last-named packing-rings for forcing them apart, substantially as described.

8. In a rod-packing, the combination with the stuffing-box, rod and gland, of interiorly-tapered packing-rings at the opposite ends of the stuffing-box, exteriorly-tapered packing-rings fitting within said first-mentioned rings about the rod, a packing-cup interposed between the rings at the opposite ends of the stuffing-box having confronting interiorly-tapered packing-seats, one of which is removably secured therein, rod-packing rings fitting within said seats and a spring or springs interposed between said packing-rings for forcing them apart; said packing-cup having oil-ports therein between the inclosed packing-rings, and an oil-cup on the stuffing-box having an outlet communicating with said ports in the packing-cup, substantially as described.

9. In a rod-packing, the combination with the stuffing-box and gland secured thereto, of a packing cup or receptacle within said stuffing-box containing slightly-separated packing-rings, and means interposed between said rings for yieldingly forcing them apart, so as to compress the packing and provide an annular oil-chamber around the rod between the rings; said packing-receptacle being of smaller diameter than the interior of the stuffing-box to provide an annular oil-chamber surrounding the same, and having a series of ports affording communication between said annular chambers, and an oil-cup on the stuffing-box communicating with said outer annular chamber, substantially as described.

10. In a rod-packing, the combination with the stuffing-box and gland secured thereto, of a packing cup or receptacle within said stuffing-box containing slightly-separated packing-rings and means interposed between said rings for yieldingly forcing them apart so as to compress the packing and provide an annular oil-chamber around the rod between the rings; said packing-receptacle being of smaller diameter than the interior of the stuffing-box to provide an annular oil-chamber surrounding the same, and having a series of ports affording communication between said annular chambers, and an oil-cup on the stuffing-box communicating with said outer annular chamber, whereby the packing is submerged in oil, substantially as described.

11. In a rod-packing, the combination with the stuffing-box and gland secured thereto, of a packing cup or receptacle within said stuffing-box containing slightly-separated packing-rings, and means interposed between said rings for yieldingly forcing them apart, so as to compress the packing and provide an annular oil-chamber around the rod between the rings; said packing-receptacle being of smaller diameter than the interior of the stuffing-box to provide an annular oil-chamber surrounding the same, and having a series of ports affording communication between said annular chambers, and an oil-cup on the stuffing-box communicating with said outer annular chamber, together with packing-rings on the rod at each end of the packing-receptacle closing the ends of the annular chamber around the same, whereby the packing-receptacle and packing contained within and about the same may be enveloped in oil, substantially as described.

In testimony whereof I affix my signature in presence of two witnesses.

THOMAS GUNNI SAXTON.

Witnesses:
R. C. STOLL,
E. C. HATHAWAY.